United States Patent
Yasui et al.

(10) Patent No.: US 7,657,353 B2
(45) Date of Patent: *Feb. 2, 2010

(54) ROLL INCREASING TENDENCY ESTIMATION APPARATUS

(75) Inventors: Yoshiyuki Yasui, Nagoya (JP); Toshihisa Kato, Handa (JP); Hiroshi Matsuoka, Toyota (JP); Junya Nagaya, Kariya (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 825 days.

This patent is subject to a terminal disclaimer.

(21) Appl. No.: 11/190,818

(22) Filed: Jul. 28, 2005

(65) Prior Publication Data

US 2006/0241833 A1 Oct. 26, 2006

(30) Foreign Application Priority Data

Apr. 21, 2005 (JP) ............................. 2005-124102

(51) Int. Cl.
*B60G 17/016* (2006.01)
(52) U.S. Cl. .............................. 701/38; 701/70; 701/75; 280/5.502
(58) Field of Classification Search .................. 701/34, 701/36, 38, 41, 42, 45, 70, 72, 75; 180/197; 303/146; 280/5.502, 5.506
See application file for complete search history.

(56) References Cited

U.S. PATENT DOCUMENTS

| 6,086,168 | A | 7/2000 | Rump |
| 6,438,463 | B1 | 8/2002 | Tobaru et al. |
| 6,694,226 | B2 | 2/2004 | Tobaru et al. |
| 7,058,492 | B1 * | 6/2006 | Yasui et al. .................. 701/38 |
| 2002/0173882 | A1 | 11/2002 | Tobaru et al. |

FOREIGN PATENT DOCUMENTS

| JP | 07-164985 A | 6/1995 |
| JP | 2000-168526 A | 6/2000 |
| JP | 2001-71787 | 3/2001 |

(Continued)

OTHER PUBLICATIONS

Masato Abe, "Vehicle Dynamics and Control", May 31, 1994, pp. 2-3 and 148-149, published by Sankaido Co. Ltd. (cited in the specification).

(Continued)

*Primary Examiner*—Gertrude Arthur Jeanglaud
(74) *Attorney, Agent, or Firm*—Buchanan Ingersoll & Rooney PC

(57) ABSTRACT

According to a roll increasing tendency estimation apparatus, a state variable is calculated in response to magnitude of a rolling moment of the vehicle, to provide a roll input magnitude, and a state variable is calculated in response to variation in time of the rolling moment, to provide a roll input velocity. A roll increasing tendency of a vehicle is estimated on the basis of a relationship between the calculated roll input magnitude and the calculated roll input velocity. On the basis of a relationship between the roll input magnitude and roll input velocity, at least one of a braking force control and a driving force control may be performed, to restrain the roll increasing tendency of the vehicle.

14 Claims, 8 Drawing Sheets

FOREIGN PATENT DOCUMENTS

| | | |
|---|---|---|
| JP | 2004-66940 A | 3/2004 |
| JP | 2004-209998 A | 7/2004 |
| JP | 2005-28918 A | 2/2005 |
| JP | 2005-88770 A | 4/2005 |

OTHER PUBLICATIONS

Office Action dated May 26, 2009 in corresponding Japanese Application No. 2005-124102 and English language translation.

* cited by examiner

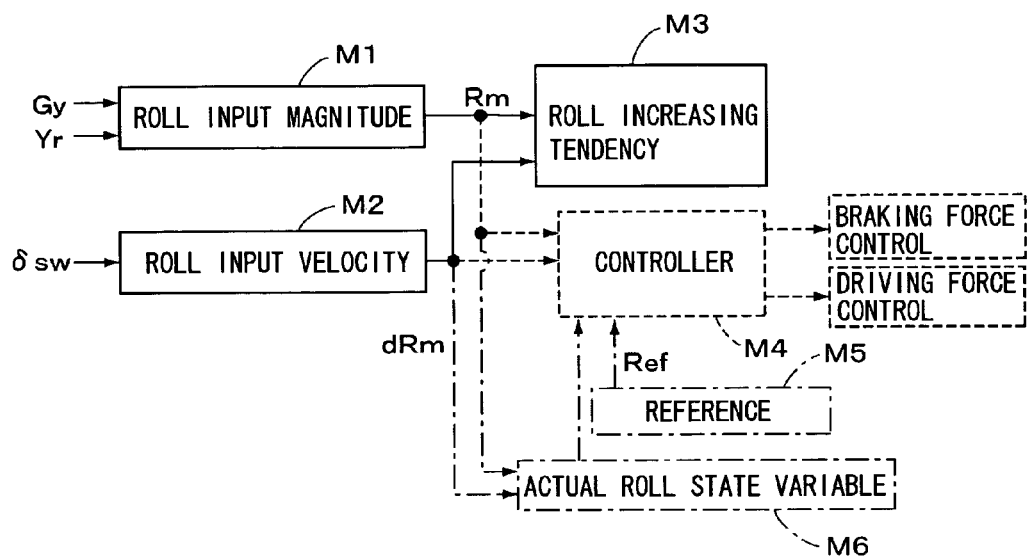
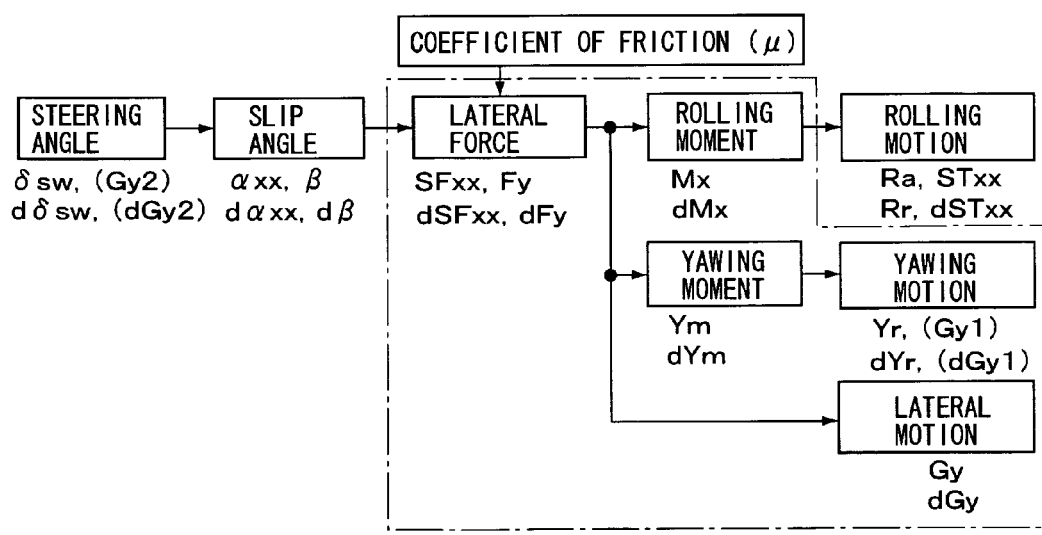

FIG. 11

| | | |
|---|---|---|
| INPUT OF ROLLING MOTION (ROLL STATE VARIABLE) | STATE VARIABLE INDICATIVE OF MAGNITUDE (ROLL INPUT MAGNITUDE) (Rm) | · STEERING WHEEL ANGLE ($\delta$ sw) |
| | | (→ESTIMATED LATERAL ACCELERATION (Gy2)) |
| | | · WHEEL SLIP ANGLE ($\alpha$xx) |
| | | · VEHICLE SLIP ANGLE ($\beta$) |
| | | · YAW VELOCITY (Yr) |
| | | (→ESTIMATED LATERAL ACCELERATION (Gy1)) |
| | | · LATERAL ACCELERATION (Gy) |
| | | · WHEEL LATERAL FORCE (SFxx) |
| | | · INERTIA FORCE (Fy) |
| | | · ROLLING MOMENT (Mx) |
| | | · YAWING MOMENT (Ym) |
| | STATE VARIABLE INDICATIVE OF VELOCITY (ROLL INPUT VELOCITY) (dRm) | · STEERING WHEEL ANGULAR VELOCITY (d$\delta$ sw) |
| | | (→VARIATION OF ESTIMATED LATERAL ACCELERATION (dGy2)) |
| | | · WHEEL SLIP VELOCITY (d$\alpha$xx) |
| | | · VEHICLE SLIP VELOCITY (d$\beta$) |
| | | · YAW ACCELERATION (dYr) |
| | | (→VARIATION OF ESTIMATED LATERAL ACCELERATION (dGy1) |
| | | · VARIATION OF LATERAL ACCELERATION (dGy) |
| | | · VARIATION OF WHEEL LATERAL FORCE (dSFxx) |
| | | · VARIATION OF INERTIA FORCE (dFy) |
| | | · VARIATION OF ROLLING MOMENT (dMx) |
| | | · VARIATION OF YAWING MOMENT (dYm) |

ROLL INCREASING TENDENCY ESTIMATION APPARATUS

This application claims priority under 35 U.S.C. Sec. 119 to No. 2005-124102 filed in Japan on Apr. 21, 2005, the entire content of which is herein incorporated by reference.

BACKGROUND OF THE INVENTION

1. Field of the Invention

The present invention relates to a roll increasing tendency estimation apparatus, particularly relates to an apparatus for estimating a roll increasing tendency of a vehicle according to a two-dimensional relationship between magnitude and velocity of a rolling motion input provided as variables. According to the relationship, at least one of a braking force and a driving force is made by a rolling motion stability control apparatus, to restrain the roll increasing tendency of the vehicle.

2. Description of the Related Arts

In order to maintain a stability of a vehicle, there is known heretofore an apparatus for controlling a braking force applied to each wheel by means of a braking system, as disclosed in the U.S. Pat. No. 6,086,168, for example. In the United States patent, described is "For at least one vehicle-movement dynamics characteristic variable which is indicative of the tendency of the vehicle to tilt about the longitudinal axis, an associated tilting-prevention threshold value is prescribed. The respective characteristic-variable instantaneous value is acquired continuously and compared with the tilting-prevention threshold value. As soon as a characteristic-variable instantaneous value exceeds the associated tilting-prevention threshold value, the wheels which are on the outside during cornering are braked in order to prevent the vehicle tilting about the longitudinal axis of the vehicle." Also, it is described that the instantaneous values of vehicle-movement dynamics characteristic variables include variables such as the lateral acceleration, the change over time of the lateral acceleration, the attitude angle, the attitude-angle velocity, the change in the attitude-angle velocity over time and the slip angle. And, as a first embodiment of the method, it is proposed that the lateral acceleration is the only vehicle-movement dynamics characteristic variable. With respect to another embodiment, it is described that the lateral acceleration, the change in the lateral acceleration over time, the attitude angle, the attitude-angle velocity, the change in the attitude-angle velocity over time and the slip angle are used as vehicle movement-dynamics characteristic variables. And, it is described that if one or more characteristic variables exceed the associated threshold values, the vehicle-movement dynamics control system brakes the wheels which are on the outside during cornering, such that they are placed in a high slip state.

According to the method as described in the above United States patent, it focused on a vehicle behavior during cornering, which is a motion about a longitudinal axis of the vehicle, to be classified as a rolling motion in view of a vehicle motion control, as described in a book entitled "Vehicle Dynamics and Control" written by Masato Abe, and published by Sankaido Co. Ltd., on May 31, 1994. On Page 3 of that book, the rolling motion has been classified as a motion which is basically created by a steering operation, together with a lateral motion of the vehicle, and a yawing motion about a vertical axis of the vehicle. And, it is described on Page 148 of the book that if a rolling moment acts on the vehicle, a roll angle will be caused about a roll center.

In general, the roll angle has been employed as a factor indicative of the rolling motion of the vehicle, as described above. With respect to the roll angle, in Japanese Patent Laid-open Publication No. 2001-71787 and its English abstract of esp@cenet database, disclosed is a method proposed to improve the accuracy of deciding whether a vehicle is liable to roll over or not from its roll angle and roll angular velocity. It is described in the English abstract that with threshold lines plotted on a two-dimensional map employing parameters, or a vehicle roll angle and roll angular velocity, the hysteresis of the actual roll angle and roll angular velocity of the vehicle, when crossing either the threshold line from a non roll over region including the origin to a roll over region delimited away from the origin, shows that the vehicle is liable to roll over. According to the method as proposed in the above Japanese Publication, it is provided with a roll angular velocity sensor, which outputs the roll angular velocity, the integrated value of which is employed as a variation of the roll angle, and added to an initial value of the roll angle calculated on the basis of the output of a lateral acceleration sensor, thereby to obtain the roll angle. Then, it is described that the result determined whether there is a possibility of roll over of the vehicle can be used for controls for inflating an inflatable curtain, inflating a side air bag, extending a retractable roll over, or the like.

The method as proposed in the above Japanese Publication is applied to apparatuses which are adapted to perform the control for inflating the inflatable curtain or the like, in response to the result of determination based on the roll angle and roll angular velocity. Therefore, it is required to be capable of determining that the rolling motion of the vehicle has been excessive, to such an extent that vehicle passengers must be protected by inflating the inflatable curtain. On the contrary, it is not appropriate to inflate the inflatable curtain in such a state that the rolling motion of the vehicle is not so large.

In contrast, when the rolling motion is determined for the stability control of the vehicle in the rolling motion, it is required to detect a slight rolling motion. Therefore, the method as described in the above Japanese Publication can not be applied to the determination of the rolling motion for the stability control of the vehicle according to the present invention. In addition, the method as described in the above Japanese Publication requires the roll angular velocity sensor, which will result in increase in cost of an apparatus for executing the method.

In the U.S. patent as described before, it is described that a plurality of vehicle-movement dynamics characteristic variables such as the lateral acceleration, and explained is one embodiment that employs the lateral acceleration as the only dynamics characteristic variable, and the other one embodiment that employs one or more characteristic variables as the dynamics characteristic variables. With respect to the former embodiment, however, described is "as soon as the characteristic-variable instantaneous value exceeds the associated tilting-prevention threshold value", and with respect to the latter embodiment, described is "if one or more characteristic variables exceed the associated threshold values". Thus, it is a fundamental requisite in either embodiment that the characteristic variables are compared with the associated threshold values, respectively. Therefore, even if it was possible to apply the one or more characteristic variables to the method for determining the tendency of the vehicle to tilt about the longitudinal axis, as proposed in the above-described U.S. patent, it would not be possible to appropriately determine the rolling motion to be used in the vehicle motion stability control according to the present invention.

As well known heretofore is such an apparatus that performs a control for stabilizing the yawing motion of the vehicle through a braking force control and a driving force control, and called as an Electronic Stability Control (abbreviated as ESC), it is beneficial in cost to use components of the yawing motion stability control apparatus, in the rolling motion stability control apparatus, as well. Especially, it is desirable to provide such an apparatus that is capable of estimating the roll increasing tendency early and accurately, without requiring expensive devices like the roll angular velocity sensor or the like as required in the Japanese Publication, to be added to the yawing motion stability control apparatus.

SUMMARY OF THE INVENTION

Accordingly, it is an object of the present invention to provide a roll increasing tendency estimation apparatus for estimating a roll increasing tendency of a vehicle early and accurately, without any additional devices such as a roll velocity sensor or the like.

It is another object of the present invention to provide a vehicle motion stability control apparatus for stabilizing a rolling motion of the vehicle, by performing at least one of a braking force control and a driving force control to restrain the roll increasing tendency of the vehicle appropriately, without any additional devices such as the roll velocity sensor or the like.

In accomplishing the above and other objects, the roll increasing tendency estimation apparatus includes a roll input magnitude calculation device for calculating a state variable in response to magnitude of a rolling moment of the vehicle, to provide a roll input magnitude, and a roll input velocity calculation device for calculating a state variable in response to variation in time of the rolling moment, to provide a roll input velocity. A roll increasing tendency estimation device is provided for estimating the roll increasing tendency of the vehicle, on the basis of a relationship between the roll input magnitude calculated by the roll input magnitude calculation device and the roll input velocity calculated by the roll input velocity calculation device. Accordingly, not only a dynamic roll increasing tendency and a static roll increasing tendency, but also an intermediate roll increasing tendency can be estimated appropriately.

In the roll increasing tendency estimation apparatus, the roll input magnitude calculation device may be adapted to calculate the roll input magnitude on the basis of at least one of a lateral acceleration and a yaw velocity applied to the vehicle. And, the roll input velocity calculation device may be adapted to calculate the roll input velocity on the basis of a steering angle provided in response to steering operation of the vehicle.

Preferably, a vehicle motion stability control apparatus for restraining a roll increasing tendency of a vehicle includes a roll input magnitude calculation device for calculating a state variable in response to magnitude of a rolling moment of the vehicle, to provide a roll input magnitude, and a roll input velocity calculation device for calculating a state variable in response to variation in time of the rolling moment, to provide a roll input velocity. A control device is provided for performing at least one of a braking force control and a driving force control of the vehicle, on the basis of a relationship between the roll input magnitude calculated by the roll input magnitude calculation device and the roll input velocity calculated by the roll input velocity calculation device, to restrain the roll increasing tendency of the vehicle.

In the vehicle motion stability control apparatus, the roll input magnitude calculation device may be adapted to calculate the roll input magnitude on the basis of at least one of a lateral acceleration and a yaw velocity applied to the vehicle. And, the roll input velocity calculation device may be adapted to calculate the roll input velocity on the basis of a steering angle provided in response to steering operation of the vehicle.

The apparatus may further include a lateral acceleration sensor for detecting the lateral acceleration applied to the vehicle, wherein the roll input magnitude calculation device calculates an estimated lateral acceleration on the basis of the yaw velocity applied to the vehicle, and provide the roll input magnitude to be a larger one between the estimated lateral acceleration and the lateral acceleration detected by the lateral acceleration sensor.

Or, a vehicle motion stability control apparatus for restraining a roll increasing tendency of a vehicle may include a reference setting device for setting a reference for estimating the roll increasing tendency of the vehicle, a roll input magnitude calculation device for calculating a state variable in response to magnitude of a rolling moment of the vehicle, to provide a roll input magnitude, and a roll input velocity calculation device for calculating a state variable in response to variation in time of the rolling moment, to provide a roll input velocity. Also, an actual roll state variable calculation device is provided for calculating an actual roll state variable of the vehicle, with the roll input magnitude calculated by the roll input magnitude calculation device and the roll input velocity calculated by the roll input velocity calculation device being as state variables. A control device is provided for performing at least one of a braking force control and a driving force control of the vehicle, on the basis of a deviation between the actual roll state variable calculated by the actual roll state variable calculation device and the reference set by the reference setting device, to restrain the roll increasing tendency of the vehicle.

In the apparatus as described above, the reference setting device may be adapted to limit the reference, with an upper limit provided for the roll input magnitude. Or, the reference setting device may be adapted to limit the reference, with a lower limit provided for the roll input magnitude. Furthermore, the reference setting device may be adapted to modify the reference in response to coefficient of friction of a road surface on which the vehicle is running.

BRIEF DESCRIPTION OF THE DRAWINGS

The above stated object and following description will become readily apparent with reference to the accompanying drawings, wherein like referenced numerals denote like elements, and in which:

FIG. 1 is a schematic block diagram of a roll increasing tendency estimation apparatus, and a vehicle motion stability control apparatus according to an embodiment of the present invention;

FIG. 2 is a block diagram showing state variables indicative of inputs of rolling motion of a vehicle according to the present invention;

FIG. 11 is a table showing roll state variables indicative of inputs of rolling motion according to an embodiment of the present invention.

DESCRIPTION OF THE PREFERRED EMBODIMENTS

Referring to FIG. 1, there is schematically illustrated a roll increasing tendency estimation apparatus according to an embodiment of the present invention. FIG. 1 illustrates a block diagram of the roll increasing tendency estimation apparatus for estimating the roll increasing tendency, which is provided with a roll input magnitude calculation device M1 which calculates a state variable in response to magnitude of a rolling moment of a vehicle (not shown), to provide a roll input magnitude (Rm), and a roll input velocity calculation device M2 which calculates a state variable in response to variation in time of the rolling moment, to provide a roll input velocity (dRm). Then, a roll increasing tendency estimation device M3 is provided for estimating the roll increasing tendency of the vehicle, on the basis of a relationship between the roll input magnitude (Rm) calculated by the roll input magnitude calculation device M1 and the roll input velocity (dRm) calculated by the roll input velocity calculation device M2.

As for the roll input magnitude calculation device M1, there is a device which calculates the roll input magnitude (Rm) on the basis of at least one of a lateral acceleration (Gy) and a yaw velocity (Yr) applied to the vehicle. And, as for the roll input velocity calculation device M2, there is a device which calculates the roll input velocity (dRm) on the basis of a steering angle (δsw) provided in response to steering operation of the vehicle. Furthermore, as for the roll input magnitude (Rm) and roll input velocity (dRm), there are various state of variables as shown in FIG. 11 as will be described later in detail, other than the lateral acceleration (Gy), yaw velocity (Yr) and steering angle (δsw).

Figure 3:
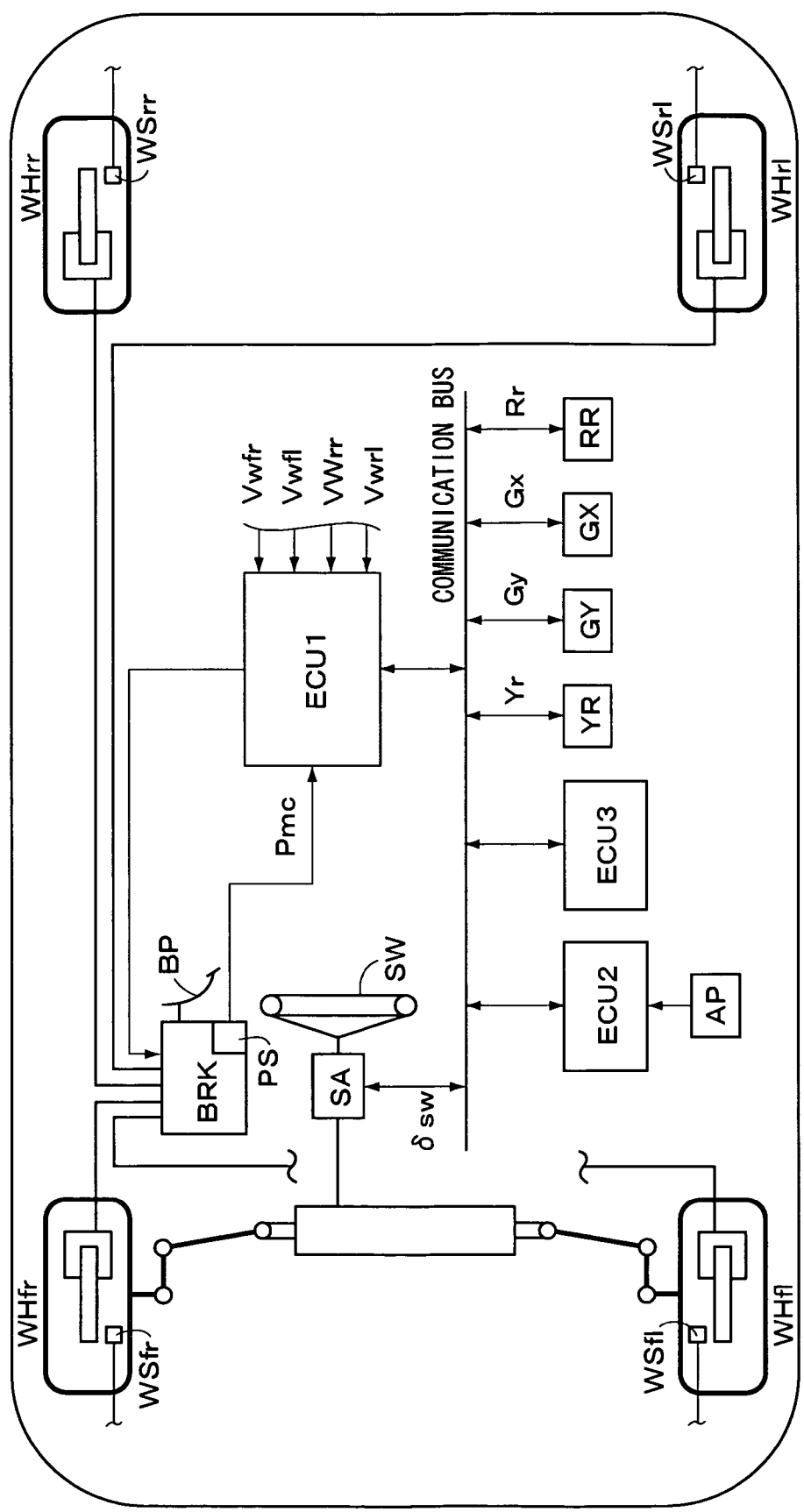
FIG. 3 is a schematic block diagram of a vehicle having a vehicle motion stability control apparatus according to an embodiment of the present invention.

In FIG. 1, also disclosed is a vehicle motion stability control apparatus for restraining a roll increasing tendency of a vehicle, which is provided with the roll input magnitude calculation device M1 and roll input velocity calculation device M2, and also provided with a controller M4 as indicated by broken lines, which performs at least one of a braking force control and a driving force control of the vehicle, on the basis of a relationship between the roll input magnitude (Rm) and roll input velocity (dRm), to restrain the roll increasing tendency of the vehicle. If the roll input magnitude calculation device M1 is so constituted as to provide the roll input magnitude (Rm) to be a larger one between the lateral acceleration calculated on the basis of the yaw velocity (Yr) and the lateral acceleration detected by a lateral acceleration sensor ("GY" as shown in FIG. 3), the vehicle can be controlled appropriately to be stable, especially when the vehicle is likely to be in an oversteer condition in accordance with its roll increasing tendency.

Furthermore, as for another embodiment, the vehicle motion stability control apparatus may be provided with a reference setting device M5 as indicated by broken lines in FIG. 1, which is adapted to set a reference (Ref) for estimating the roll increasing tendency of the vehicle, and provided with an actual roll state variable calculation device M6, which calculates an actual roll state variable of the vehicle, with the roll input magnitude (Rm) calculated by the roll input magnitude calculation device M1 and the roll input velocity (dRm) calculated by the roll input velocity calculation device M2 being as state variables. And, the controller M4 performs at least one of the braking force control and the driving force control of the vehicle, on the basis of a deviation between the actual roll state variable and the reference (Ref), to restrain the roll increasing tendency of the vehicle. The reference setting device M5 may be adapted to limit the reference (Ref), with an upper limit provided for the roll input magnitude (Rm), or with a lower limit provided for the roll input magnitude (Rm), as will be described later in detail with reference to FIG. 7. Furthermore, the reference (Ref) for estimating the roll increasing tendency may be modified in response to coefficient of friction of a road surface on which the vehicle is running.

Next will be explained the roll increasing tendency of the vehicle according to the present invention. The roll increasing tendency may be classified as the one which is caused by a rapid rolling motion (hereinafter, referred to as dynamic roll increasing tendency), the one which is caused by a relatively gradual rolling motion (hereinafter, static roll increasing tendency), and the one which has an intermediate characteristic between the dynamic roll increasing tendency and the static roll increasing tendency (hereinafter, intermediate roll increasing tendency). The dynamic roll increasing tendency is caused, provided that, with the rapid steering operation or a reverse steering operation being made by a vehicle driver, the rolling motion is rapidly increased, so that a suspension member abuts on a bound stopper to be compressed, whereby a wheel, with the suspension member at a side thereof to be expanded, is forced to be lifted. In contrast, the static roll increasing tendency is caused in such a gradual rolling motion that the roll angle is gradually increased, while the roll velocity (corresponding to the roll angular velocity in the aforementioned English abstract) is small. This is resulted from mainly such a state that a gravity position of the vehicle has been placed to be high, with the number of passengers being increased, or with loading conditions being changed.

Provided that the two-dimensional map employing the vehicle roll angle and roll (angular) velocity, as described in the aforementioned Japanese Publication, is used to estimate the roll increasing tendency, in the vehicle motion stability control apparatus for restraining the roll increasing tendency, it will be disadvantageous in terms of estimating the roll increasing tendency early, because the roll angle and roll velocity are the state variables resulted from the rolling motion. In addition, as the roll angle is obtained generally by integrating the roll velocity, it may be difficult to obtain the roll angle accurately when estimating the static roll increasing tendency, because the roll velocity produced at that time will be relatively small.

According to the present invention, therefore, the roll increasing tendency is estimated on the basis of the magnitude of roll input which causes the rolling motion. As for the state variables indicative of the input of the rolling motion, there are a roll input magnitude (Rm) indicative of magnitude of the input of the rolling motion, and a roll input velocity (dRm) indicative of velocity of the input of the rolling motion. In order to estimate the static roll increasing tendency, the roll input magnitude (Rm) is desirable, whereas the roll input velocity (dRm) is appropriate in order to estimate the dynamic roll increasing tendency. According to the present embodiment, therefore, the roll increasing tendency is estimated on the basis of the two-dimensional map, with the roll input magnitude (Rm) and roll input velocity (dRm) being used as variables, so as to enable any one of the static roll increasing tendency, dynamic roll increasing tendency and intermediate roll increasing tendency to be estimated accurately.

Figure 10:
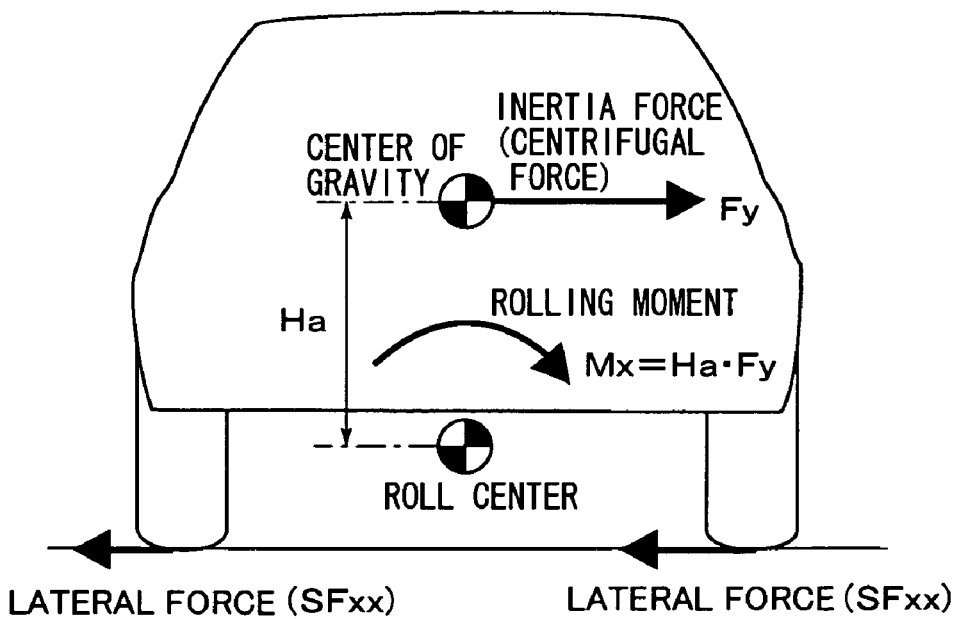
FIG. 10 is a diagram showing a relationship among state variables provided in a rolling motion of an ordinary vehicle.

At the outset, the state variables of the vehicle rolling motion are explained hereinafter, with reference to FIG. 10. When a steering wheel (not shown) is operated by a vehicle driver, the vehicle is turned, with a slip angle (αxx) produced on each wheel, and a lateral force (SFxx) produced on each wheel, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. In this case, an inertia force (centrifugal force) (Fy) acts on the gravity center of the vehicle, to balance with the lateral force produced on the wheel. However, the gravity center of the vehicle is not placed on the same position as the center of the rolling motion (i.e., roll center), so that there is a distance (Ha) between the gravity center and the roll center, to produce a rolling moment (Mx), i.e., (Mx)=(Ha)·(Fy). As a result, the rolling motion of the vehicle is created by the rolling moment, and if the rolling motion is excessive, it can be estimated that the vehicle is in the roll increasing tendency.

Therefore, as for the state variables indicative of the input of the rolling motion (roll state variables), there are the steering wheel angle (δsw) and steering wheel angular velocity (dδsw), wheel slip angle (αxx) and its velocity (dαxx), vehicle slip angle (β) and its velocity (dβ), wheel lateral angle (SFxx) and its variation in time (dSFxx), vehicle inertia force (Fy) and its variation in time (dFy), and further the rolling moment (Mx) of the direct input of the rolling motion, and its variation in time (dMx). As the inertia force (the sum of lateral force for all wheels) corresponds to the vehicle lateral acceleration, a vehicle lateral acceleration (Gy) detected by a lateral acceleration sensor GY (described later) and its variation in time (dGy) can be included in the roll state variables. Also, as the lateral force produces a yawing motion of the vehicle, a yawing moment (Ym) and its variation in time (dYm), yaw velocity (Yr) and its variation in time (yaw acceleration) (dYr) can be employed as the roll state variables.

In this case, as the lateral acceleration of the vehicle can be indicated by other state variables, according to equations as described hereinafter, they may be used for the roll state variables. First of all, an estimated lateral acceleration (Gy1) obtained by the yaw velocity (Yr) can be calculated according to the following equation (1):

$$Gy1 = V \cdot Yr \quad (1)$$

where "V" is a vehicle speed.

Likewise, a variation in time (dGy1) of the estimated lateral acceleration (Gy1) can be calculated according to the following equation (2):

$$dGy1 = V \cdot dYr \quad (2)$$

where "dYr" is a variation in time of the yaw velocity (Yr), i.e., yaw acceleration.

Then, an estimated lateral acceleration (Gy2) obtained by the steering wheel angle (dδsw) can be calculated according to the following equation (3):

$$Gy2 = [V^2/\{L \cdot (1+Kh \cdot V^2)\}] \cdot (\delta sw/N) \quad (3)$$

where "L" is a wheel base, "Kh" is a stability factor, and "N" is a steering gear ratio.

Or, if Kh=0 (neutral steering) is used, the estimated lateral acceleration (Gy2) can be calculated according to the following equation (3'):

$$Gy2 = (V^2/L) \cdot (\delta sw/N) \quad (3')$$

Likewise, a variation in time (dGy2) of the estimated lateral acceleration (Gy2) can be calculated according to the following equation (4):

$$dGy2 = [V^2/\{L \cdot (1+Kh \cdot V^2)\}] \cdot (d\delta sw/N) \quad (4)$$

where "dδsw" is a steering wheel angular velocity.

Or, if Kh=0 (neutral steering) is used, the estimated lateral acceleration (Gy2) can be calculated according to the following equation (4'):

$$dGy2 = (V^2/L) \cdot (d\delta sw/N) \quad (4')$$

The state variables indicative of the input of the rolling motion (hereinafter, referred to as roll state variables) as described above are classified as shown in FIG. 11, wherein the roll input magnitude (Rm) indicative of magnitude of the input of the rolling motion, and the roll input velocity (dRm) indicative of velocity of the input of the rolling motion are classified separately. In FIG. 11, the state variables following an arrow indicated in parentheses are those obtained through the calculations.

Referring to FIG. 3, there is schematically illustrated an overall structure of a vehicle with the vehicle motion stability control apparatus according to an embodiment of the present invention. A brake system electronic control unit ECU1, engine system electronic control unit ECU2, and instrument panel electronic control unit ECU3 are connected to one another through a communication bus, so that the information for each control unit can be fed from other control units. Furthermore, there are provided a steering angle sensor SA for detecting the steering angle (δsw) of a steering wheel SW, a longitudinal acceleration sensor GX for detecting a vehicle longitudinal acceleration (Gx), a lateral acceleration sensor GY for detecting a vehicle lateral acceleration (Gy), a yaw rate sensor YR for detecting a yaw rate (Yr) of the vehicle and so on, which are electrically connected to each electronic control unit to supply thereto the sensor signals. A brake actuator BRK is provided for applying a braking force to each wheel in response to depression of a brake pedal BP of the vehicle driver, and controlling the braking force on each wheel independently in response to a signal from the electronic control unit ECU1, when the vehicle rolling motion stability control is required, as described later. A pressure sensor PS is provided in the brake actuator BRK for detecting an amount of operation of the brake pedal BP by the vehicle driver, to feed its detected pressure (Pmc) to the brake system electronic control unit ECU1. The braking force control for the rolling motion stability control can be performed, even in the case where the vehicle driver is not operating the brake pedal BP.

As shown in FIG. 3, at each wheel WHxx of the vehicle, there is provided a wheel speed sensor WSxx, which is connected to the electronic control unit ECU1. And, a signal having pulses proportional to a rotational speed of each wheel, i.e., a wheel speed signal is fed to the electronic control unit ECU1, wherein a vehicle speed (V) in the longitudinal direction of the vehicle is calculated on the basis of wheel speed signals (Vwxx) fed from the wheel speed sensors WSxx. The amount of operation (Ap) of an accelerator pedal (not shown) is detected by an accelerator pedal sensor AP, and fed to the electronic control unit ECU1 through the communication bus as described before.

According to the present embodiment, the vehicle rolling motion stability control is performed in the brake system electronic control unit ECU1. When the vehicle rolling motion stability control starts, the braking force applied to each wheel is controlled independently, so as to restrain the vehicle roll increasing tendency. Furthermore, signals for controlling the driving force applied to the wheel are fed to the engine system electronic control unit ECU2 through the communication bus, so as to reduce engine torque by controlling a throttle opening, ignition timing, amount of fuel to be injected and so on, and control the driving force applied to the wheel. At the same time, notification signals are fed to the instrument panel electronic control unit ECU3 through the communication bus, so as to actuate a visible or audible annunciator (not shown) for notifying the vehicle driver of the vehicle state.

Figure 4:
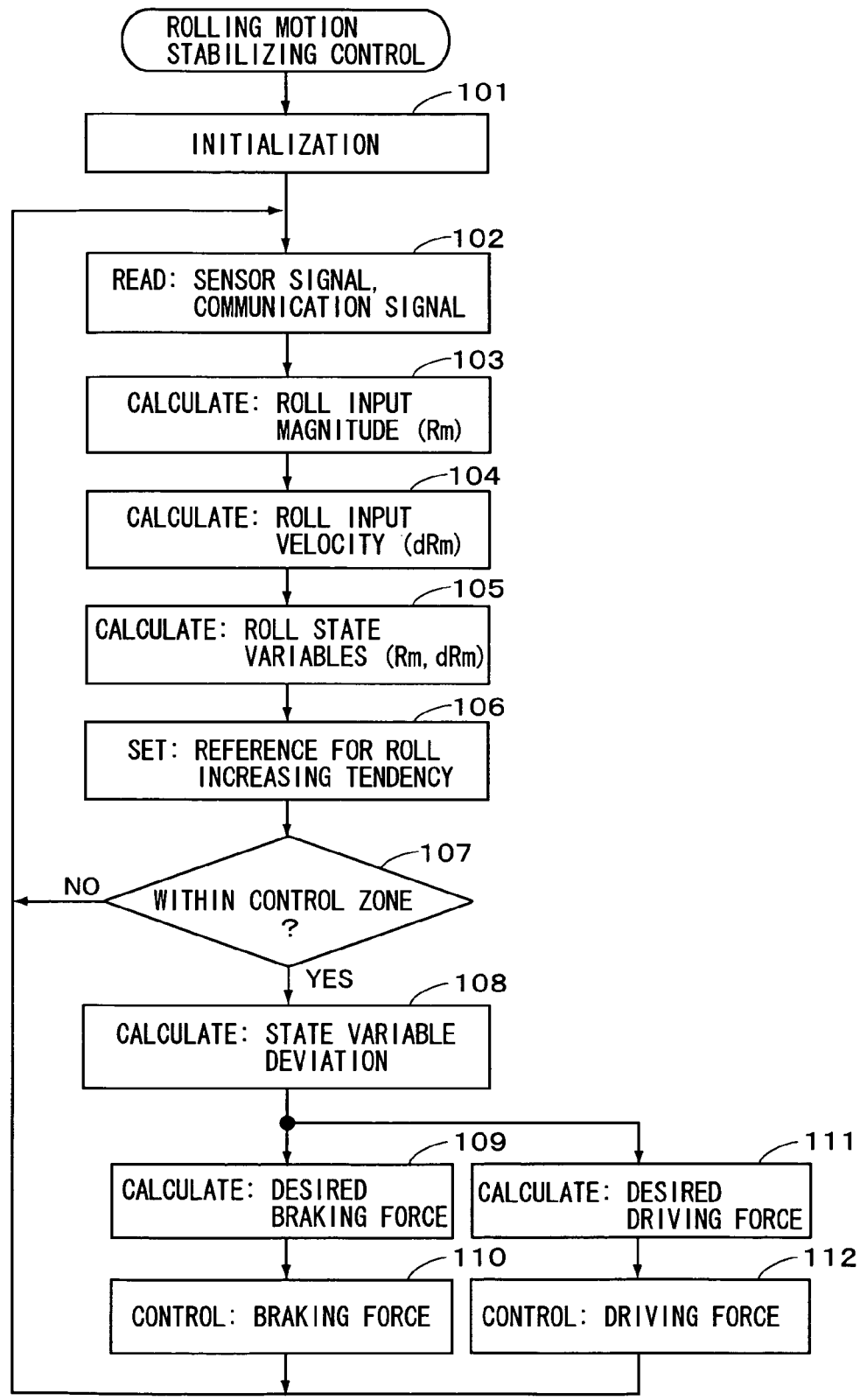
FIG. 4 is a flowchart for an example of a rolling motion stability control according to an embodiment of the present invention.

Referring to FIG. 4, the rolling motion stability control according to the present embodiment will be performed as follows. At the outset, the program provides for initialization of the system at Step 101, and the signals detected by various sensors and communication signals are read at Step 102. Then the program proceeds to Step 103, where the roll input magnitude (Rm) indicative of magnitude of the input of the rolling motion is calculated, and further proceeds to Step 104, where the roll input velocity (dRm) indicative of velocity of the input of the rolling motion is calculated. The roll input magnitude (Rm) and roll input velocity (dRm) are those included in the state variables as shown in FIG. 11, and calculated according to a known manner.

At Step 105, therefore, the state variable indicative of actual rolling motion, i.e., roll state variable, is indicated by (Rm, dRm), with the roll input magnitude (Rm) and the roll input velocity (dRm) being employed as variables. Next, a reference characteristic for use in estimating the vehicle roll increasing tendency is set at Step 106, to provide a reference (Ref) for estimating the roll increasing tendency. Then, it is determined at Step 107 whether the roll state variable (Rm, dRm) is within a control zone relative to the reference (Ref) for estimating the roll increasing tendency. In this respect, the control zone is a zone wherein the braking force control and driving force control are required to stabilize the rolling motion of the vehicle. If it is determined at Step 107 that the roll state variable (Rm, dRm) is outside the control zone relative to the reference (Ref) for estimating the roll increasing tendency, the program returns to Step 102, without the braking force control and driving force control being performed. On the contrary, if it is determined that the roll state variable (Rm, dRm) is within the control zone, the program proceeds to Step 108, where a deviation (state variable deviation) of the roll state variable (Rm, dRm) against the reference (Ref) for estimating the roll increasing tendency is calculated. Instead, the calculation to be made at Step 108 may be achieved prior to Step 107, and the determination made at Step 107 may be achieved on the basis of the state variable deviation.

Accordingly, the program proceeds to Step 109 where a desired braking force (BFdxx) is calculated for each wheel on the basis of the state variable deviation. And, the brake actuator BRK is controlled in response to the desired braking force (BFdxx) at Step 110. When the desired braking force (BFdxx) is calculated, may be considered the amount of operation of the brake pedal BP made by the vehicle driver, e.g., master cylinder pressure to be input as a detected pressure (Pmc). Likewise, a desired driving force is calculated at Step 111 on the basis of the state variable deviation, so that the amount of engine torque to be reduced is determined. Then, an engine system actuator (not shown) is actuated to control the throttle opening, ignition timing, amount of fuel to be injected and so on. When the desired driving force is calculated, may be considered the amount of operation of the accelerator pedal AP made by the vehicle driver.

Figure 5:
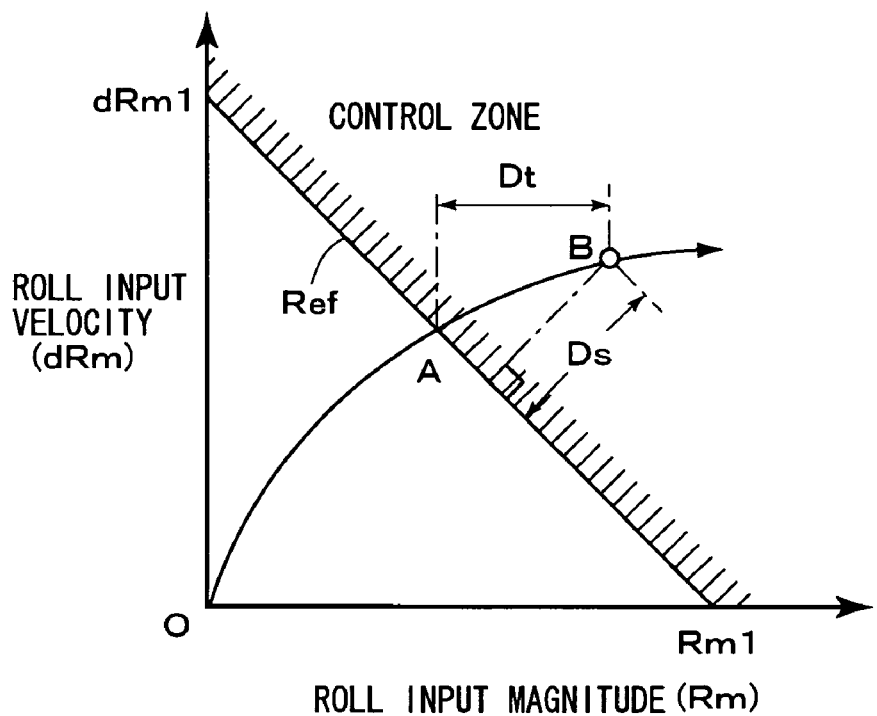
FIG. 5 is a diagram showing an example of a control map including a reference for estimating a roll increasing tendency according to an embodiment of the present invention.

Next, referring to FIG. 5, the reference (Ref) for estimating the roll increasing tendency to be used at Steps 106-108 will be explained hereinafter. The reference characteristic for use in determining the vehicle roll increasing tendency, i.e., the reference (Ref) for estimating the roll increasing tendency is set by a two-dimensional relationship (two-dimensional map) with the roll input magnitude (Rm) and roll input velocity (dRm) being as variables. In FIG. 5, the reference (Ref) for estimating the roll increasing tendency is shown as a characteristic provided in the first quadrant. With respect to characteristics of cornering or turning operation of the vehicle, the characteristic of left turn can be provided to be symmetrical relative to the characteristic of right turn about the origin. In FIG. 5, therefore, the characteristic of turning operation only to one direction is shown, and that of turning operation to the other direction is omitted, herein.

The reference (Ref) for estimating the roll increasing tendency can be set according to a straight line function provided by the following equation (5):

$$dRm = -(dRm1/Rm1) \cdot Rm + dRm1 \qquad (5)$$

where Rm1 and dRm1 are constants for providing the reference (Ref) for estimating the roll increasing tendency, to be set in advance on the basis of the vehicle dimensions or the like. Or, Rm1 and dRm1 may be set according to vehicle states such as the vehicle speed, to provide the reference (Ref) for estimating the roll increasing tendency to be variable. Instead of the reference (Ref) for estimating the roll increasing tendency with the straight line function, it may be set according to a combination of a plurality of straight line functions, or a curvilinear function. Or, instead of the functions, a numerical map may be employed.

Next will be explained the determination of the control zone executed at Step 107 in FIG. 4. When the roll state variable (Rm, dRm) indicative of the actual rolling motion of the vehicle is increased to cross the reference (Ref) for estimating the roll increasing tendency as indicated by a curved arrow line in FIG. 5, and come to be larger than the reference (Ref), it is determined that the roll state variable (Rm, dRm) is fallen within the control zone for requiring the braking force control and driving force control to stabilize the rolling motion. Thus, as the estimation of the roll increasing tendency of the vehicle (whether or not being within the control zone) is made on the basis of the two-dimensional relationship, with the roll input magnitude (Rm) and roll input velocity (dRm) being as variables, not only the dynamic roll increasing tendency and the static roll increasing tendency, but also the intermediate roll increasing tendency can be estimated appropriately. In contrast, according to one-dimensional estimation of the roll increasing tendency made on the basis of the roll state variable, e.g., estimation based on such a condition as exceeding a predetermined roll input magnitude, or a estimation of the roll increasing tendency with a mere combination of one-dimensional estimations, e.g., estimation based on such conditions as exceeding a predetermined roll input magnitude and exceeding a predetermined roll input velocity, the intermediate roll increasing tendency may not be estimated appropriately.

With respect to the calculation of the state variable deviation executed at Step 108 in FIG. 4, the deviation of the roll state variable (Rm, dRm) against the reference (Ref) for estimating the roll increasing tendency is calculated. For example, the state variable deviation is calculated as a minimal distance between the roll state variable (Rm, dRm) and the reference (Ref), to provide a state variable deviation (Ds), as shown in FIG. 5. Or, the state variable deviation may be calculated as the deviation against the roll input magnitude (Rm) when the roll state variable (Rm, dRm) increases to cross the reference (Ref) for estimating the roll increasing tendency, to provide a state variable deviation (Dt) as shown in FIG. 5.

Figure 6:
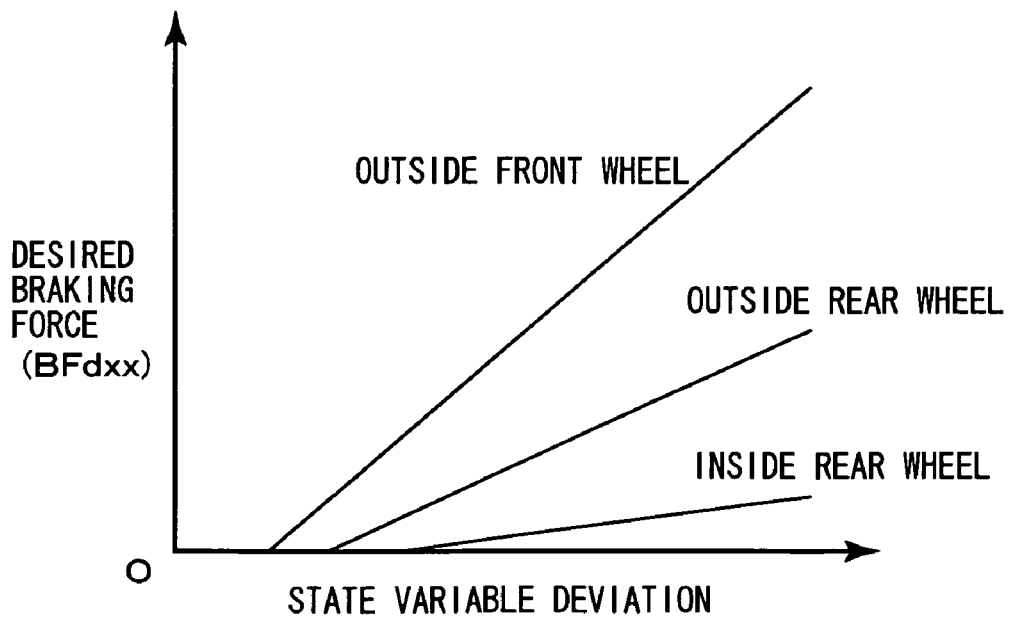
FIG. 6 is a diagram showing an example of a map for calculating a desired braking force provided for each wheel of a front wheel located outside during cornering, a rear wheel located outside during cornering, and a rear wheel located inside during cornering, on the basis of a state variable deviation, according to an embodiment of the present invention.

The desired braking force (BFdxx) obtained at Step 109 in FIG. 4 is calculated on the basis of the state variable deviation obtained at Step 108, to provide the desired braking force (BFdxx) for each wheel as shown in FIG. 6. That is, in order to restrain the roll increasing tendency of the vehicle with an appropriate yawing moment being maintained, calculated is the desired braking force (BFdxx) for each wheel of a front wheel located outside during cornering, a rear wheel located outside during cornering, and rear wheel located inside during cornering, on the basis of the state variable deviation. Thus, the braking force control is executed in response to the state variable deviation, such that if the rolling motion is very severe with respect to the roll increasing tendency of the vehicle, relatively strong braking force will be applied to restrain the roll increasing tendency. On the contrary, if the state variable deviation is relatively small, while the roll increasing tendency of the vehicle has been found, minimal braking force will be applied to stabilize the roll increasing tendency. In order to reduce the vehicle speed rapidly, with the appropriate yawing moment being maintained, one wheel or plurality of wheels may be selected as the wheel to be controlled. For example, it is effective to apply the braking force to all of four wheels, one wheel of the front wheel located outside during cornering, two front wheels and the rear wheel located inside during cornering, or two front wheels and the rear wheel located outside during cornering.

As explained with reference to FIG. 10, the rolling moment for producing the rolling motion of the wheel is created by lateral force applied to each wheel. As the lateral force of each wheel is affected by a frictional condition with a coefficient of friction (μ), the magnitude of the rolling moment is affected by the coefficient of friction (μ), to be restrained thereby. For example, on a so-called low coefficient of friction road surface, whose coefficient of friction is relatively low, such as a pressed snow road surface or icy road surface, the rolling moment is not so large as to indicate an apparent roll increasing tendency. Therefore, when the reference (Ref1) for estimating the roll increasing tendency is set, as shown in FIG. 7, may be provided a lower limit (Rm2), whereby if the roll input magnitude (Rm) is lower than the lower limit (Rm2), the estimation of the roll increasing tendency shall not be made, so that the braking force control and driving force control shall not be performed.

Figure 7:
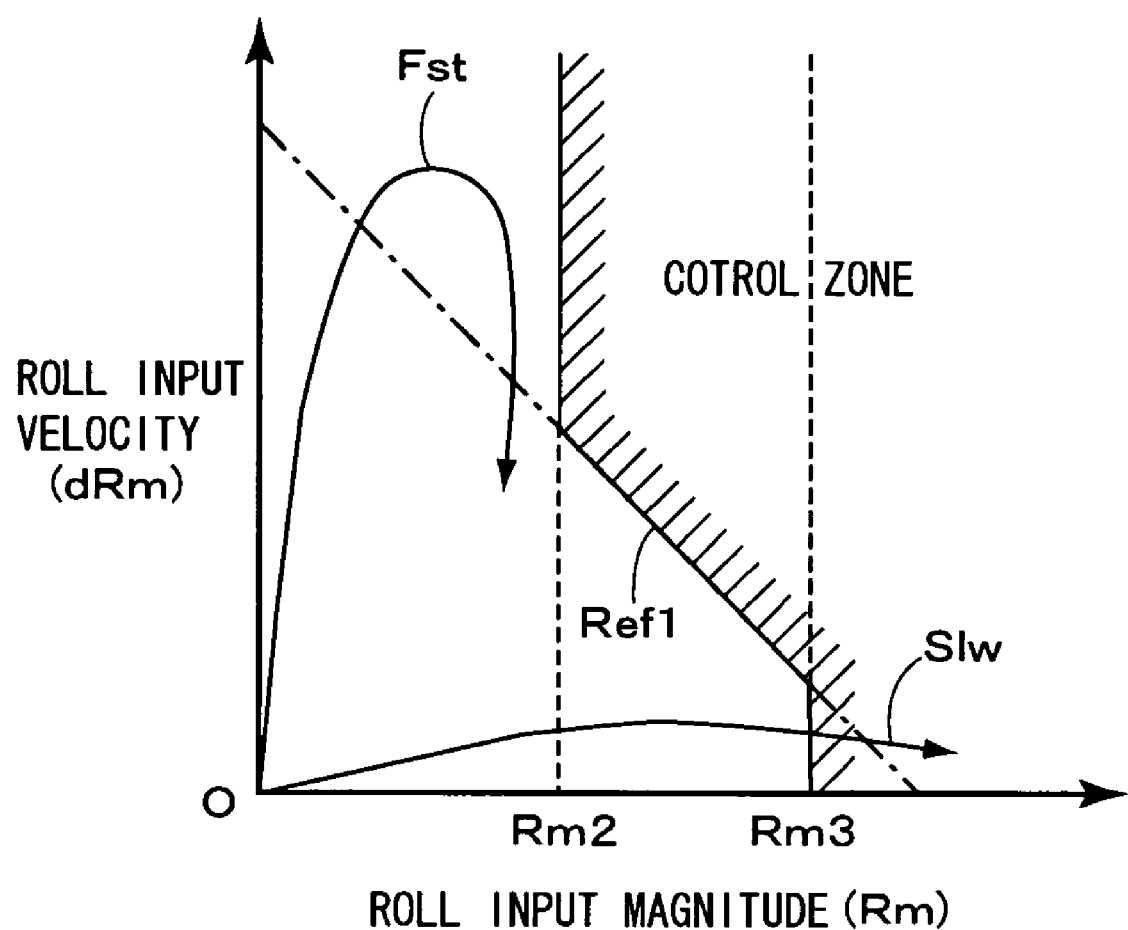
FIG. 7 is a diagram showing an example of a control map provided with a lower limit and upper limit to a reference for estimating a roll increasing tendency, according to an embodiment of the present invention.

In FIG. 7, with respect to a rapid steering operation on a road surface with low coefficient of friction (μ) as indicated by a state variation (Fst), the roll input velocity (dRm) is large enough, but the roll input magnitude (Rm) is not so large as to indicate an apparent roll increasing tendency, so that the braking force control and driving force control will not be made. Thus, as the lower limit (Rm2) is provided for the roll input magnitude (Rm) in setting the reference for estimating the roll increasing tendency, unnecessary control operations may be prevented, to avoid giving a different feeling to the vehicle driver, during a rapid rolling motion on a road surface whose low coefficient of friction (μ) is not so large as to indicate the apparent roll increasing tendency. On the other hand, there may be a case where the roll increasing tendency is likely to be caused, if the turning operation of the vehicle exceeds a predetermined turning state, with the number of passengers being increased, or with loading conditions being changed. In this case, it is preferable that the roll increasing tendency shall be restrained certainly, even if only the gradual rolling motion exists. Therefore, an upper limit (Rm3) may be provided for the roll input magnitude (Rm), so that if the roll input magnitude (Rm) is equal to or greater than the upper limit (Rm3), the estimation of the roll increasing tendency shall be made, to perform the braking force control and driving force control. In the gradual roll increasing tendency with the state variation (Slw) as indicated in FIG. 7, for example, even in the case where the roll input velocity (dRm) is small, if the roll input magnitude (Rm) comes to be equal to or greater than the upper limit (Rm3), the braking force control and driving force control shall be performed, whereby the roll increasing tendency of the vehicle can be restrained appropriately.

Next will be explained the roll input magnitude (Rm) and roll input velocity (dRm) which are appropriate for the state variable to be employed, out of the plurality of state variables as shown in FIG. 2. In order to respond the dynamic roll increasing tendency, it is advantageous to employ the state variable obtained as early as possible. Therefore, it is desirable to use the state variable obtained on the basis of the steering angle (δsw) of the steering wheel SW, which is the first input of the rolling motion. That is, the steering angular velocity (dδsw), or variation in time (dGy2) of the estimated lateral acceleration calculated from the steering angle (δsw) is appropriate for the roll input velocity (dRm). When estimating the roll increasing tendency of the vehicle, not only the early estimation but also certain estimation based on the road surface condition are required. As shown in FIG. 7, with respect to the reference for estimating the roll increasing tendency, the lower limit (Rm2) and the upper limit (Rm3) are provided, considering the influence of the coefficient of friction (μ) affected to the lateral force which is the input of the rolling motion. Thus, it is desirable for the roll input magnitude (Rm) to use the state variable reflected by the result from the coefficient of friction (μ), which state variable is one of those enclosed in one-dot chain line in FIG. 2. The lateral acceleration (Gy), yaw velocity (Yr), or the state variable obtained thereby are the state variables indicative of the vehicle behavior in a lateral direction or yaw direction, which are resulted from the lateral force created on each wheel. Therefore, those state variables reflect the road surface condition, i.e., the coefficient of friction (μ), so that they can be used for the roll input magnitude (Rm). The lateral acceleration (Gy), yaw velocity (Yr), or the state variable provided thereby are the state variables, which are resulted from operation of the steering wheel SW, but which are obtained later in time than the state variables obtained on the basis of the steering angle ($\delta$sw) of the steering wheel SW. However, as the static roll increasing tendency corresponds to a relatively gradual vehicle behavior, the state variables obtained by the vehicle behavior in a lateral direction or yaw direction can be used for the roll input magnitude (Rm).

Accordingly, in the case where the roll increasing tendency of the vehicle is estimated on the basis of two state variables, the state variable affected by the coefficient of friction ($\mu$) may be used for the roll input magnitude (Rm), and the state variable obtained on the basis of the steering angle ($\delta$sw) of the steering wheel SW may be used for the roll input velocity (dRm), in combination with the former state variable. As a result, the dynamic roll increasing tendency can be estimated appropriately by the state variable obtained on the basis of the steering angle ($\delta$sw), and the static roll increasing tendency can be estimated appropriately by the state variable obtained on the basis of the state variable affected by the coefficient of friction ($\mu$), respectively. Furthermore, the intermediate increasing tendency can be estimated appropriately by the state variable obtained on the basis of the two-dimensional relationship, with the roll input magnitude (Rm) and roll input velocity (dRm) being as variables.

Figure 8:
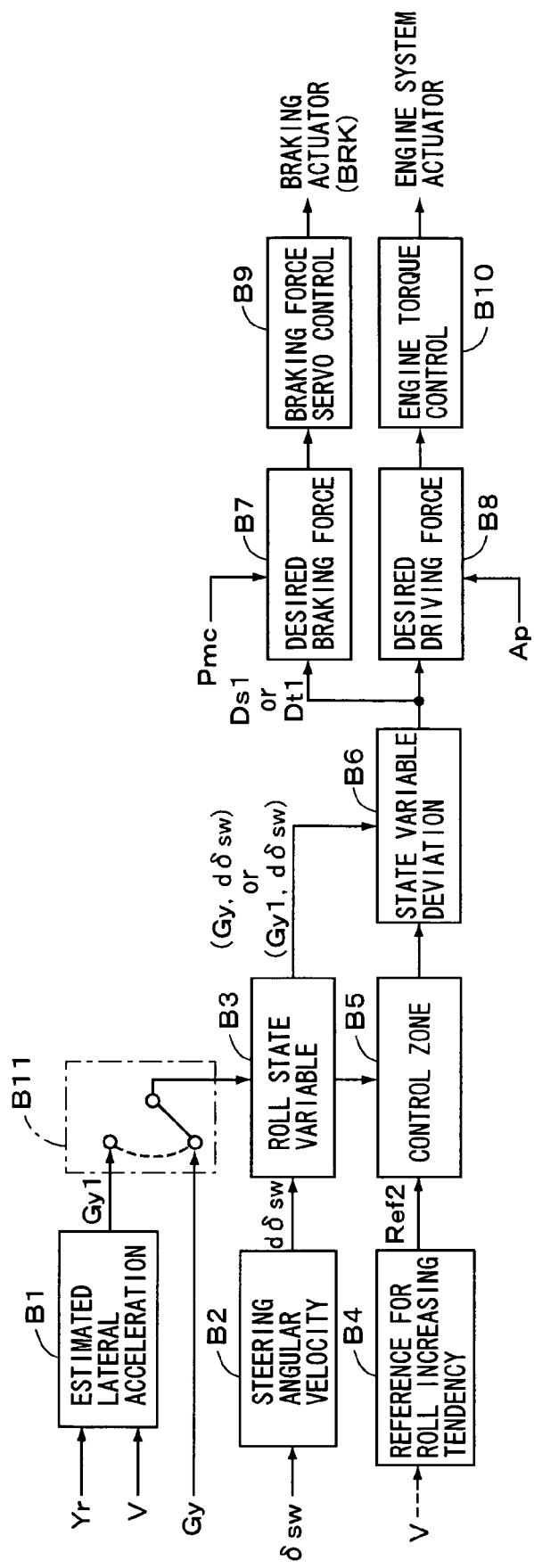
FIG. 8 is a block diagram showing a rolling motion stability control performed by a vehicle motion stability control apparatus according to another embodiment of the present invention.

Referring to FIG. 8, will be explained the estimation of the vehicle roll increasing tendency and the braking force control and driving force control for stabilizing the vehicle rolling motion, to be performed in combination of the state variable affected by the coefficient of friction ($\mu$) to be used for the roll input magnitude (Rm), and the state variable obtained on the basis of the steering angle ($\delta$sw) of the steering wheel SW to be used for the roll input velocity (dRm). As for the roll input magnitude (Rm), will be divided into three cases, i.e., (A) the lateral acceleration (Gy) detected by the lateral acceleration sensor GY is used, (B) the estimated lateral acceleration (Gy1) obtained by the yaw velocity is used, and (C) larger one between the detected lateral acceleration (Gy) and the estimated lateral acceleration (Gy1) is used.

(A) In the case where the detected lateral acceleration (Gy) is used as the roll input magnitude (Rm): In FIG. 8, on the basis of the steering angle ($\delta$sw) of the steering wheel SW, its variation in time is calculated to obtain the steering angular velocity (d$\delta$sw) at Block B2. And, on the basis of the detected lateral acceleration (Gy) and the steering angular velocity (d$\delta$sw), the roll state variable (Gy, d$\delta$sw) indicative of the actual rolling motion is obtained at Block B3. Also, the reference (Ref2) for estimating the roll increasing tendency is set at Block B4 to be the value provided in advance. In this case, it is effective to take the vehicle speed (V) into consideration, because the higher the vehicle speed is, more likely the roll increasing tendency is to be caused. The practical calculation of the reference for estimating the roll increasing tendency will be described later in detail. Then, the roll state variable (Gy, d$\delta$sw) indicated by the lateral acceleration (Gy) and the steering angular velocity (d$\delta$sw) is compared with the reference for estimating the roll increasing tendency at Block B5. As a result, if it is determined that the rolling motion is outside of the control zone with respect to the reference (Ref2) for estimating the roll increasing tendency, the control is not allowed. On the contrary, if it is determined that the rolling motion is inside of the control zone, the control is allowed, so that the deviation (Ds1 or Dt1) between the roll state variable (Gy, d$\delta$sw) and the reference (Ref2) for estimating the roll increasing tendency is calculated at Block B6, according to the same manner as explained with reference to FIG. 5. Next, the desired braking force and desired driving force are calculated on the basis of the state variable deviation, at Blocks B7 and B8, respectively, according to the same manner as explained with reference to FIG. 6. When those desired values are provided, the amount of braking operation (master cylinder pressure Pmc) and the amount of accelerator pedal operation (Ap), which indicate operating state of the vehicle driver, are taken into consideration. And, signals for controlling the brake actuator BRK and the engine system actuator (not shown) are output to equalize the actual braking force and driving force with the desired braking force and driving force, at Blocks B9 and B10, respectively.

(B) In the case where the estimated lateral acceleration (Gy1) is used as the roll input magnitude (Rm): On the basis of the yaw velocity (Yr) and vehicle velocity (V), the estimated lateral acceleration (Gy1) is calculated at Block B1, according to the aforementioned equation (1). Then, on the basis of the estimated lateral acceleration (Gy1) and the steering angular velocity (d$\delta$sw) obtained at Block B2, the roll state variable (Gy1, d$\delta$sw) is obtained at Block B3. Thereafter, the same manner as explained in the case (A) is applied to this case, so that its explanation will be omitted.

(C) In the case where the larger one between the detected lateral acceleration (Gy) and the estimated lateral acceleration (Gy1) is used as the roll input magnitude (Rm): On the basis of the yaw velocity (Yr) and vehicle velocity (V), the estimated lateral acceleration (Gy1) is calculated at Block B1, according to the aforementioned equation (1). Then, the estimated lateral acceleration (Gy1) is compared with the detected lateral acceleration (Gy), and the one with the larger absolute value is selected. Consequently, on the basis of the one with the larger absolute value between the detected lateral acceleration (Gy) and the estimated lateral acceleration (Gy1), the roll state variable is obtained at Block B3. Thereafter, the same manner as explained in the case (A) is applied to this case, so that its explanation will be omitted.

The yaw velocity (Yr) is the state variable with a revolving motion and rotating motion of the vehicle being included, the latter of which will be increased, if the vehicle tends to be in an over-steering state. Therefore, selected is the one with the larger absolute value between the detected lateral acceleration (Gy) detected by the lateral acceleration sensor GY, and the estimated lateral acceleration (Gy1) obtained from the yaw velocity (Yr). Thus, when the vehicle tends to be in the over-steering state according to the roll increasing tendency of the vehicle, the estimated lateral acceleration (Gy1) is selected as the roll input magnitude (Rm), whereby the vehicle can be controlled to be more stable. In the embodiment as described above, as for the roll input magnitude (Rm), employed is the steering wheel angular velocity (d$\delta$sw), on the basis of which the variation in time (dGy2) of the estimated lateral acceleration may be calculated according to the equation (4) or (4'). In other words, the variation in time (dGy2) of the estimated lateral acceleration is calculated according to the equation (4) or (4') which includes the vehicle speed (V), it will correspond to the state variable for obtaining the steering wheel angular velocity (d$\delta$sw) in response to the vehicle speed (V). With the variation in time (dGy2) of the estimated lateral acceleration being employed, therefore, it is possible to estimate the roll increasing tendency in response to the vehicle speed (V).

Figure 9:
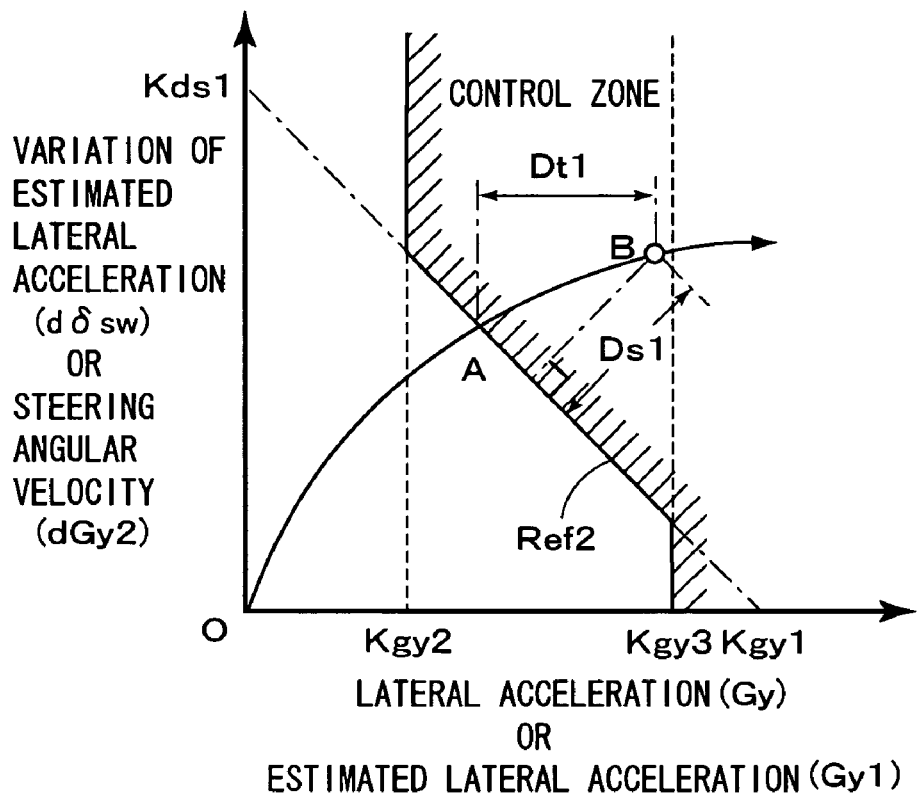
FIG. 9 is a diagram showing an example of a control map including a reference for estimating a roll increasing tendency according to another embodiment of the present invention.

Next, referring to FIG. 9, will be explained the reference (Ref2) for estimating the roll increasing tendency or the like which are obtained at Blocks B4-B6 in FIG. 8. In the same manner as described in FIGS. 5 and 7, the reference (Ref2) for estimating the roll increasing tendency is obtained. A characteristic for estimating the roll increasing tendency, as indicated by one-dot chain line in FIG. 9, is set in response to the relationship between the detected lateral acceleration (Gy) or the estimated lateral acceleration (Gy1), and the steering wheel angular velocity (dδsw) or the variation in time (dGy2) of the estimated lateral acceleration. In this case, a lower limit (Kgy2) or upper limit (Kgy3) may be provided for limiting the reference for estimating the roll increasing tendency, taking into consideration the road surface condition, i.e., the coefficient of friction (μ), which corresponds to a maximal lateral acceleration. With respect to the lateral acceleration, therefore, the lower limit and/or upper limit may be provided to limit the reference for estimating the roll increasing tendency, so that the control made on the basis of the reference for estimating the roll increasing tendency provided in response to the coefficient of friction (μ), shall not be executed when it is smaller than the lower limit (Kgy2), and that a zone with a value equal to or greater than the lower limit (Kgy2) shall be selected as the zone to be controlled. As a result, even if a rapid steering operation was made on such a road surface with a low coefficient of friction that the roll increasing tendency would not be caused, unnecessary rolling motion stability control would not be made, thereby to avoid giving any different feeling to the vehicle driver. Furthermore, in the vase where a zone with a value equal to or greater than the upper limit (Kgy3) is selected as the zone to be controlled, if the gravity position of the vehicle has been placed to be high, with the number of passengers being increased, or with loading conditions being changed, the rolling motion stability control can be made certainly even under a gradual roll increasing tendency, thereby to restrain the roll increasing tendency.

With respect to the determination whether the roll state variable has been fallen within the control zone, which is executed at Block B5, it is determined whether the roll state variable has increased to cross the reference (Ref2) for estimating the roll increasing tendency as indicated by a curved arrow line in FIG. 9. If the roll state variable has been fallen within the control zone, the roll state deviation is calculated at Block B6. The state variable deviation is obtained as a vertical distance from the reference (Ref2), i.e., state variable deviation (Ds1). Or, the state variable deviation may be calculated as the deviation between the detected lateral acceleration (Gy) or the estimated lateral acceleration (Gy1) when the roll state variable increases to cross the reference (Ref2) for estimating the roll increasing tendency, to provide a state variable deviation (Dt1).

According to the embodiment as described above, the roll input magnitude (Rm) is obtained from the state variable (lateral acceleration (Gy) or yaw velocity (Yr)) indicative of the vehicle behavior reflecting the road surface, i.e., affected by the coefficient of friction (μ). However, if the reference for estimating the roll increasing tendency is set on the basis of the coefficient of friction (μ), the same effect as described above can be obtained, without using the state variable indicative of the vehicle behavior in a lateral direction or a yawing direction. In this case, the coefficient of friction (μ) may be used from the values obtained for performing the anti-skid control (ABS), vehicle stability control (ESC), or the like. For example, an initial reference for estimating the roll increasing tendency is set on the basis of a relatively high coefficient of friction (μ), and if the coefficient of friction (μ) comes to be relatively low, the reference for estimating the roll increasing tendency may be modified to be of a relatively large value, whereby unnecessary control may be avoided. On the contrary, the initial reference for estimating the roll increasing tendency may be set on the basis of a relatively low coefficient of friction (μ), and if the coefficient of friction (μ) comes to be relatively high, the reference for estimating the roll increasing tendency may be modified to be of a relatively small value.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. An apparatus for estimating a roll increasing tendency of a vehicle, comprising:

roll input magnitude calculation means for calculating a state variable in response to magnitude of a rolling moment of said vehicle, to provide a roll input magnitude;

roll input velocity calculation means for calculating a state variable in response to variation in time of the rolling moment, to provide a roll input velocity; and roll increasing tendency estimation means for estimating the roll increasing tendency of said vehicle, on the basis of a relationship between the roll input magnitude calculated by said roll input magnitude calculation means and the roll input velocity calculated by said roll input velocity calculation means.

2. An apparatus for estimating a roll increasing tendency of a vehicle as set forth in claim 1, wherein said roll input magnitude calculation means calculates the roll input magnitude on the basis of at least one of a lateral acceleration and a yaw velocity applied to said vehicle.

3. An apparatus for estimating a roll increasing tendency of a vehicle as set forth in claim 1, wherein said roll input velocity calculation means calculates the roll input velocity on the basis of a steering angle provided in response to steering operation of said vehicle.

4. A vehicle motion stability control apparatus for restraining a roll increasing tendency of a vehicle, comprising:

roll input magnitude calculation means for calculating a state variable in response to magnitude of a rolling moment of said vehicle, to provide a roll input magnitude;

roll input velocity calculation means for calculating a state variable in response to variation in time of the rolling moment, to provide a roll input velocity; and control means for performing at least one of a braking force control and a driving force control of said vehicle, on the basis of a relationship between the roll input magnitude calculated by said roll input magnitude calculation means and the roll input velocity calculated by said roll input velocity calculation means, to restrain the roll increasing tendency of said vehicle.

5. A vehicle motion stability control apparatus as set forth in claim 4, wherein said roll input magnitude calculation means calculates the roll input magnitude on the basis of at least one of a lateral acceleration and a yaw velocity applied to said vehicle.

6. A vehicle motion stability control apparatus as set forth in claim 5, further comprising a lateral acceleration sensor for detecting the lateral acceleration applied to said vehicle, wherein said roll input magnitude calculation means calculates an estimated lateral acceleration on the basis of the yaw velocity applied to said vehicle, and provides the roll input magnitude to be a larger one between the estimated lateral acceleration and the lateral acceleration detected by said lateral acceleration sensor.

7. A vehicle motion stability control apparatus as set forth in claim 4, wherein said roll input velocity calculation means calculates the roll input velocity on the basis of a steering angle provided in response to steering operation of said vehicle.

8. A vehicle motion stability control apparatus for restraining a roll increasing tendency of a vehicle, comprising:

reference setting means for setting a reference for estimating the roll increasing tendency of said vehicle;

roll input magnitude calculation means for calculating a state variable in response to magnitude of a rolling moment of said vehicle, to provide a roll input magnitude;

roll input velocity calculation means for calculating a state variable in response to variation in time of the rolling moment, to provide a roll input velocity;

actual roll state variable calculation means for calculating an actual roll state variable of said vehicle, with the roll input magnitude calculated by said roll input magnitude calculation means and the roll input velocity calculated by said roll input velocity calculation means being as state variables; and control means for performing at least one of a braking force control and a driving force control of said vehicle, on the basis of a deviation between the actual roll state variable calculated by said actual roll state variable calculation means and the reference set by said reference setting means, to restrain the roll increasing tendency of said vehicle.

9. A vehicle motion stability control apparatus as set forth in claim 8, wherein said roll input magnitude calculation means calculates the roll input magnitude on the basis of at least one of a lateral acceleration and a yaw velocity applied to said vehicle.

10. A vehicle motion stability control apparatus as set forth in claim 9, further comprising a lateral acceleration sensor for detecting the lateral acceleration applied to said vehicle, wherein said roll input magnitude calculation means calculates an estimated lateral acceleration on the basis of the yaw velocity applied to said vehicle, and provides the roll input magnitude to be a larger one between the estimated lateral acceleration and the lateral acceleration detected by said lateral acceleration sensor.

11. A vehicle motion stability control apparatus as set forth in claim 8, wherein said roll input velocity calculation means calculates the roll input velocity on the basis of a steering angle provided in response to steering operation of said vehicle.

12. A vehicle motion stability control apparatus as set forth in claim 8, wherein said reference setting means is adapted to limit the reference, with an upper limit provided for the roll input magnitude.

13. A vehicle motion stability control apparatus as set forth in claim 8, wherein said reference setting means is adapted to limit the reference, with a lower limit provided for the roll input magnitude.

14. A vehicle motion stability control apparatus as set forth in claim 8, wherein said reference setting means is adapted to modify the reference in response to coefficient of friction of a road surface on which said vehicle is running.

* * * * *